United States Patent [19]
Balgeman et al.

[11] Patent Number: 5,446,880
[45] Date of Patent: Aug. 29, 1995

[54] DATABASE COMMUNICATION SYSTEM THAT PROVIDES AUTOMATIC FORMAT TRANSLATION AND TRANSMISSION OF RECORDS WHEN THE OWNER IDENTIFIED FOR THE RECORD IS CHANGED

[75] Inventors: Timothy E. Balgeman, Warrenville; Diane M. Clodi, Oswego; Robert W. Haddleton, Jr., Naperville; John R. North, Geneva; Judith A. Selby, Wheaton, all of Ill.

[73] Assignee: AT&T Corp., Murray Hill, N.J.

[21] Appl. No.: 937,814

[22] Filed: Aug. 31, 1992

[51] Int. Cl.6 .............................. G06F 17/30
[52] U.S. Cl. .................. 395/600; 395/200.01; 364/241.7; 364/242.5; 364/284.3; 364/DIG. 1
[58] Field of Search ............... 395/600, 200; 340/825.05; 364/DIG. 1, DIG. 2, 241.7, 241.8, 242.5, 384.3

[56] References Cited

U.S. PATENT DOCUMENTS

| | | | |
|---|---|---|---|
| 4,031,512 | 6/1977 | Fabor | 340/825.05 |
| 4,135,240 | 1/1979 | Ritchie | 395/600 |
| 4,714,995 | 12/1987 | Materna et al. | 395/600 |
| 4,714,995 | 12/1987 | Materna et al. | 395/600 |
| 4,933,846 | 6/1990 | Humphrey et al. | 395/325 |
| 5,119,465 | 6/1992 | Jack et al. | 395/500 |
| 5,249,231 | 9/1993 | Covey et al. | 395/425 |
| 5,276,869 | 1/1994 | Forrest et al. | 395/600 |
| 5,283,887 | 2/1994 | Zachery | 395/500 |
| 5,329,618 | 7/1994 | Moati et al. | 395/200 |

FOREIGN PATENT DOCUMENTS

0216535A2  1/1987  European Pat. Off.

OTHER PUBLICATIONS

Papasoglou et al. "Distributed Heterogeneous Information Systems & Schema Transformation", *Parbase-90*, Conf Date, 7–9 Mar. 1990, pp. 388–397 IEEE.

Pu, "Superdatabases for Composition of Heterogeneous Databases", *Pr. 4th Int. Conf. On Data Engineering*, date 1–5 Feb. 1988; pp. 548–555.

Chung, "DATAPLEX: an access to Heterogeneous distributed databases", *Communications Of The ACM*, Jan. 1990: V33 issue h1, p. 70–81.

J. Gray & S. Metz "Solving The Problems of Distributed Databases", Data Communications, vol. 12, No. 10, Oct., 1983, pp. 183–192.

R. Ahmed et al. "The Pegasus Heterogeneous Multidatabase Systems", Computer, vol. 24, No. 12, Dec., 1991, pp. 19–26.

"Financial Systems Interface", IBM Technical Disclosure Bulletin, vol. 31, No. 5, Oct., 1988, pp. 36–39.

*Primary Examiner*—Thomas G. Black
*Assistant Examiner*—Jack M. Choules
*Attorney, Agent, or Firm*—Charles L. Warren

[57] ABSTRACT

A database interface and associated communication program are installed in each node in a communication network. The database interface provides a translation from the record format of the database and a standardized format for transmission to other nodes thus providing translation between the formats of the different databases formats as records are transmitted between the databases on different nodes. The communication program transmits records that have been translated to the standardized format to nodes which contain corresponding records maintaining current records at each node. A node having a corresponding node can assign an owner. Assigning an owner causes the record to be sent to the database that is associated with the new owner. The owner has the responsibility for acting on the record. The originator of the record is also identified.

15 Claims, 6 Drawing Sheets

| NODE | 12 | 22 | 26 | 12 | 22 | 26 | 12 | 22 | 26 |
|---|---|---|---|---|---|---|---|---|---|
| TICKET | UN12-1487 | | | UN12-1487 | UN12-1487 | | UN12-1487 | UN12-1487 | UN12-1487 |
| ORIGINATOR | UN12 | | | UN12 | UN12 | | UN12 | UN12 | UN12 |
| OWNER | UN12 | | | N22 | N22 | | N26 | N26 | N26 |
| STATUS | OPEN | | | OPEN | OPEN | | OPEN | OPEN | OPEN |

| NODE | 12 | 22 | 26 | 12 | 22 | 26 |
|---|---|---|---|---|---|---|
| TICKET | UN12-1487 | UN12-1487 | UN12-1487 | UN12-1487 | UN12-1487 | UN12-1487 |
| ORIGINATOR | UN12 | UN12 | UN12 | UN12 | UN12 | UN12 |
| OWNER | UN12 | UN12 | UN12 | UN12 | UN12 | UN12 |
| STATUS | SOLVED | SOLVED | SOLVED | CLOSED | CLOSED | CLOSED |

DATABASE COMMUNICATION SYSTEM THAT PROVIDES AUTOMATIC FORMAT TRANSLATION AND TRANSMISSION OF RECORDS WHEN THE OWNER IDENTIFIED FOR THE RECORD IS CHANGED

BACKGROUND OF THE INVENTION

This invention relates to a communication system in which records are stored in independent databases and more specifically relates to communicating and updating corresponding records in the different independent databases. This invention is especially, but not exclusively, suited for intercompany database record sharing such as between an equipment manufacturer and its customer.

A variety of communication networks exist which can transmit data files from an origination node (NODE O) to a destination node (NODE D). However, such a transmission may not achieve the goal of transferring the desired information from NODE O to NODE D in a form readily usable at NODE D. As an example, assume that the information to be transmitted by NODE O is a record created in NODE O's independent, local database. If the objective is to create a duplicate record in an independent, local database at NODE D, the received record can be directly entered in NODE D's database assuming both NODE O and NODE D utilize the same database and the same field formats. If the database at NODE D is not directly compatible with the record received from NODE O, a user at NODE D must manually translate the received record into a record in the local database format. It is apparent that substantial inefficiencies exist where different database formats are utilized. If the databases utilized by NODE O and NODE D are controlled by independent companies, it is unlikely that each company will utilize the same database software. Even if the companies did utilize the same database software, it is even more unlikely that each will have created a substantially identical record format structures because of the different needs of each company.

It is possible to address this problem by utilizing a single database which can be accessed by a variety of users. Such a solution has the disadvantage that all of the users must agree to utilize the same format and agree to a common set of rules regarding use and access of the database. It is difficult to achieve agreement among independent companies, or even different parts of the same company, because of their differing needs and objectives regarding database capabilities.

Difficulties would still exist even if independent companies utilized the same database software and record format. Although the common structure of the database records would enable records to be communicated over a conventional communication network and entered into another database, difficulties exist in maintaining duplicate records in different databases where the record can be updated by a user at any of the independent databases. Although it is possible to establish rules requiring that new and modified records be transmitted to others in the network, this places a substantial burden on each user in systems where it is desirable to maintain duplicate records at different databases so that information can be locally accessed.

Thus, there exists a need for a communication system which provides flexibility by allowing individual nodes to utilize different databases and which automatically updates corresponding records at different databases with a minimum of burden on the users.

SUMMARY OF THE INVENTION

It is an object of the present invention to provide an improved communication system which addresses the above needs.

In accordance with an embodiment of the present invention, a database interface and an associated communication program are installed at each node in a communication network. The database interface provides a translation between the record format used at a database and a common standardized record format. Thus, the database interface provides an inbound and outbound translation of fields within a record in order to provide compatibility with varying databases utilized at different nodes. The standardized format is used by the communication program to transmit record information to the other nodes in the system. The communication program provides a means for transmitting records and updates of records to the nodes in the network which need to maintain duplicate records. This communication capability is substantially automated to minimize user demands.

DETAILED DESCRIPTION

An exemplary application of the present invention follows in order to appreciate the advantages of the present invention. Assume that a provider of telecommunications equipment is coupled via a communication system to a plurality of independent users of its equipment. A trouble ticket, i.e. a documented problem with a failure of user owned equipment, is entered by a user in an independent database controlled by the user. If the trouble ticket relates to equipment supplied by the manufacturer a copy of the trouble ticket is forwarded utilizing the database interface and communication program in accordance with an embodiment of the present invention to a corresponding field support organization of the equipment provider. If this organization is able to solve the problem, the duplicate ticket stored in a database of the support organization is modified indicating the solution or other relevant information relating to the problem and transmitted to the originating user. If the organization is unable to solve the problem, it sends a copy of the ticket to a different organization within the company with greater technical expertise and sends an update of the same ticket back to the user so that the user is apprised of the status of the trouble ticket. Assuming the higher level organization solves or otherwise handles the problem, the higher level organization updates the trouble ticket and sends a copy of the updated trouble ticket back to the field support organization which in turn sends the update to the end user. Assuming the end user is satisfied with the solution to the problem indicated on the updated trouble ticket, the ticket is updated and closed by the user with copies of the update being sent to the field support organization and the higher level technical organization. Each organization dealing with the trouble ticket is apprised of all updates to the trouble ticket by any involved party. However, each of the parties (nodes in the communication system) are free to maintain an independent database so that each can independently maintain statistics and otherwise utilize the information according to the needs of each.

The illustrative embodiment of the present invention can be incorporated in a network utilized for problem solving as explained above. However, it will be apparent to those skilled in the art that the utility of the present invention is not limited to this application.

Figure 1:
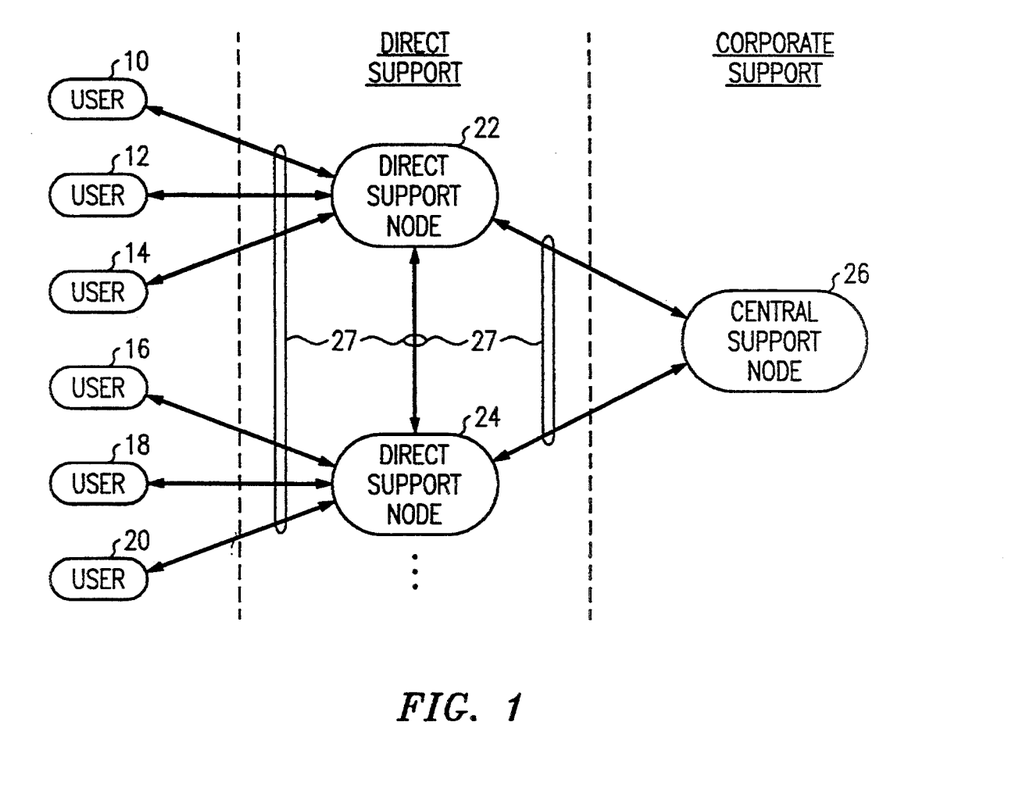
FIG. 1 is a block diagram of a typical network which incorporates an embodiment of the present invention.

FIG. 1 illustrates a communication system in which a plurality of user nodes 10–20 are coupled to support nodes 22 and 24 which are in turn coupled to central support node 26. In the illustrative example, service providers at nodes 22 and 24 are in a direct support level and have sufficient expertise to solve many of the problems posed by the users which they support. Technical experts at node 26 provide corporate support to users for problems which the service providers at the direct support nodes cannot solve. The direct support nodes are also connected to each other so that problem solving expertise can be shared at the direct support level. A communication network 27 provides communication channels among the nodes.

This embodiment of the present invention is especially well suited for utilization in the illustrative system, especially when the equipment and/or software supplied to users is complex. For example, users may encounter difficulties in configuring the equipment to properly interface with other peripheral equipment or in customizing the operation of the equipment pursuant to a desired customer configuration. Help with such problems can normally be provided by the service providers at the support nodes. Another class of problems which users may encounter deal with failures or errors in the basic operation of the equipment. Some of these problems may be solved by personnel at the support nodes, but other problems will require the greater technical expertise available from the technical experts at the central support node.

In the illustrative example, a user documents a new problem by entering appropriate information describing the equipment, nature of the problem, and other parameters utilizing the user's database. The user preferred format for storing information in the local independent database is translated into a standardized record format by a database interface which is coupled to the local database. After the information is translated into the standardized record format, a communication program in accordance with the present invention interfaces with the database interface and permits the standardized record to be transmitted to a direct support node. A database interface at the support node translates the standardized record into the appropriate format for the independent database maintained by the support node. The support node acknowledges receipt of the record to the user. Preferably, the direct support node generates an electronic mail (e-mail) message to an assigned support person, advising of the receipt of a problem ticket. After the direct support person considers the problem as documented by the user's record, the record will typically be updated by the assigned support person to contain additional information and may request additional information from the user relevant to the problem. The record at the support node is updated in the support node database and communicated to the originating user in standardized format. The database interface at the user node translates the received update from standardized format to the record format used at the user's local database. Thus, each node in the system which addresses a trouble ticket maintains an updated record regardless of the party making an update. Preferably, the person at the user node is notified by e-mail indicating that the record has been updated and thus, should be reviewed for possible additional action. Thus, the user and the assigned support person are each guaranteed of having access to the latest updated information concerning the problem while allowing each to maintain an independent database which can be tailored to meet the different needs of the user and the support provider.

Figure 2:
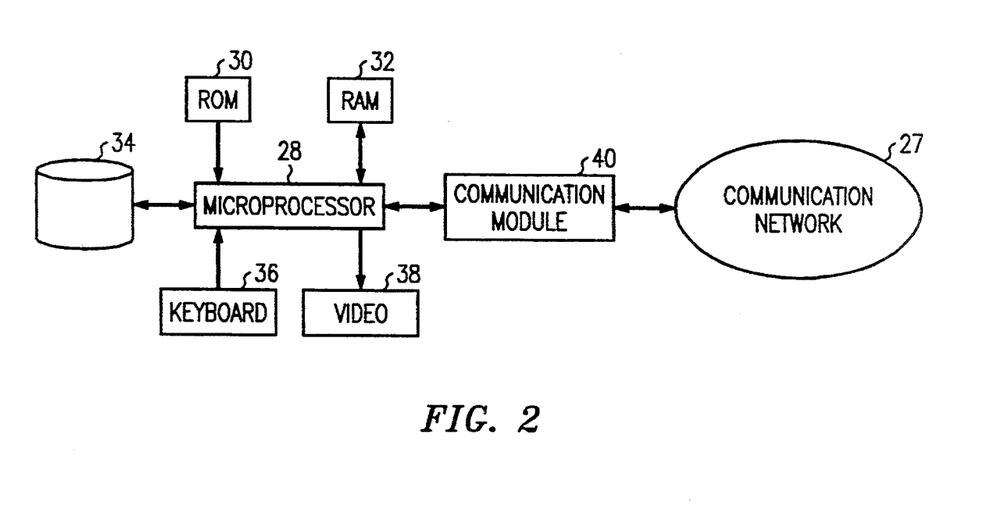
FIG. 2 is a block diagram of a typical node in the network of FIG. 1.

FIG. 2 illustrates a typical node in a system in accordance with the present invention. The node includes a microprocessor (MPU) 28, and associated memory including read-only memory (ROM) 30, random access memory (RAM) 32, and alternate memory storage 34 such as a disk or tape drive. Conventional input and output devices associated with MPU 28 include a keyboard 36, a video display terminal 38, and a communication module 40 which enables communications between MPU 28 and a communication network 27. The node as shown in FIG. 2 can be used for any of the nodes as shown in FIG. 1. The communication network 27 may comprise either the public switched telephone network such as by modems or may comprise dedicated leased lines between the users and connected nodes.

Figure 3:
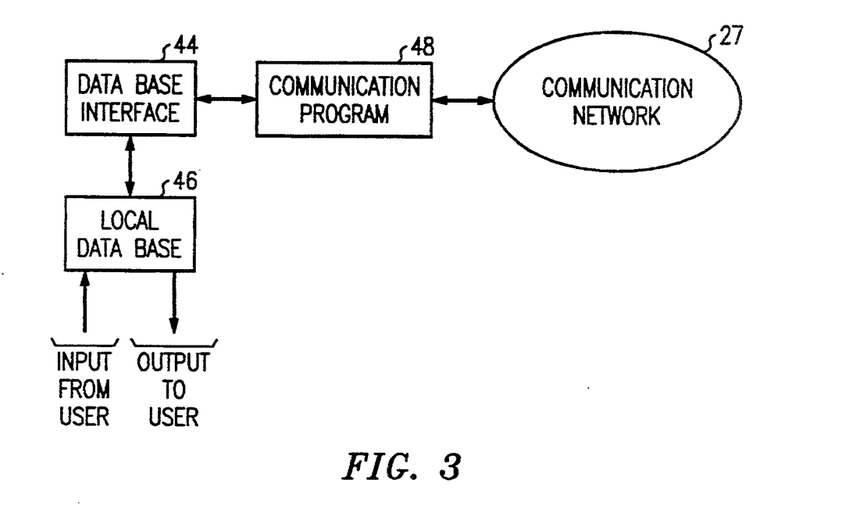
FIG. 3 is a diagram which illustrates the relationship between database interface software and communication software in accordance with the present invention.

FIG. 3 is a pictorial representation of the relationship among software in accordance with the present invention. Local database software 46 receives input from the user and provides output to the user of stored records. The database interface 44 translates the relevant fields in a record stored in the local database 46 into corresponding fields in a standardized record format. Records retrieved via interface 44 from the local database are likewise translated for transmission by communication program 48 to communication network 27 in the standardized record format. The standardized record format allows individual nodes to maintain different local database software programs and define fields within records to meet the needs of the associated users of the node. The local database may consist of conventionally available database software including flat file and relational types. In order to minimize the overall communication network requirements in order to handle the transmission of records, each of the nodes preferably utilizes a UNIX ® operating system which inherently contains communication support.

Figure 4:
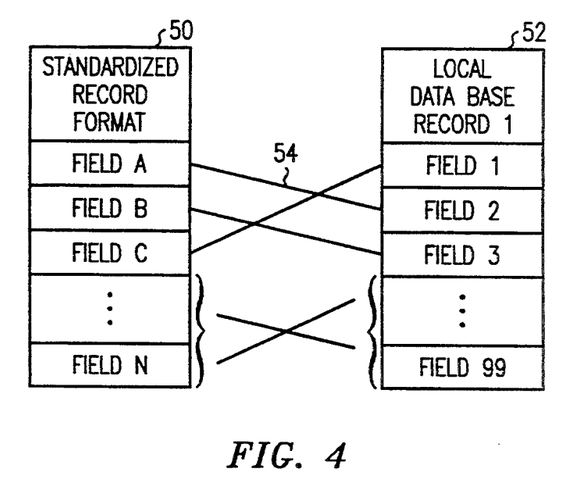
FIG. 4 is a diagram which illustrates the mapping of a local database record into a standardized record format in accordance with the present invention.

FIG. 4 graphically illustrates how the database interface 44 interfaces with the local database 46. The standardized record format 50 is defined and stored in database interface 44. It is related to a local database record format 52 utilized by the local database 46. The standardized record format 50 includes fields A-N which define different information parameters which can be communicated within the network shown in FIG. 1. The local database record format 52 includes fields 1-99 which correspond to parameters determined by the operator of the node for possible storage in local database 46. The lines 54 which interconnect one field in format 50 with one field in format 52 identify the translation or mapping which will occur when transferring records 52 stored in local database 46 to other nodes in the system. Each of the fields in record format 50 are preferably supported by a corresponding field in record format 52. The standardized record format 50 which is transmitted between nodes allows the independent databases associated with each node to be able to share information with other nodes without requiring manual re-entry of the information at another database because of different record and field structures.

In a preferred embodiment of the present invention, one of the fields in standardized record format 50 identifies if the record contains information which should be interpreted by another node as a trouble ticket, i.e. typically a request for help by another node, and another field contains a description of the product or manufacturer of the product associated with the problem. Each node preferably maintains in memory an address map which identifies the support node to receive a copy of the record dependent upon the equipment manufacturer or product entered in the corresponding record field. Thus, a user as illustrated in FIG. 1 does not have to provide an address of the direct support node associated with the problem since this addressing will be accomplished automatically merely by the user initiating the trouble ticket. Since the database interface 44 is coupled to the communication program 48 and monitors changes made to records in the local database, a person entering data in local database 46 need only change the ownership field in a trouble ticket in order to initiate transmission of the record to the appropriate supporting node. It is contemplated that the user can be coupled by the communication network to a variety of different support nodes which support different products.

Figure 5:
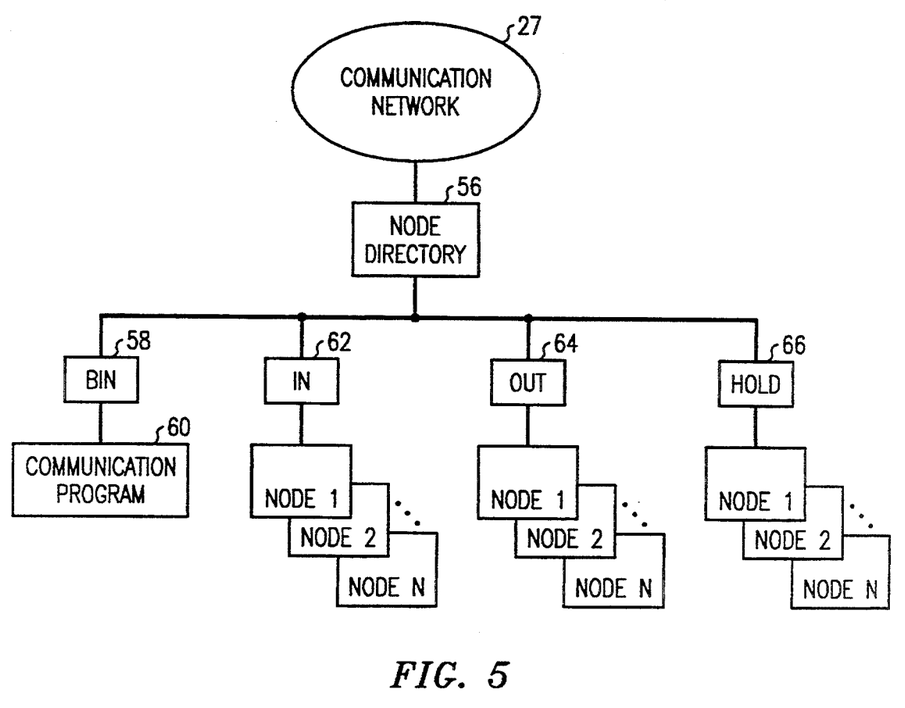
FIG. 5 illustrates an embodiment of a communication directory and file structure in accordance with an embodiment of the present invention.

FIG. 5 illustrates an exemplary directory structure, preferably associated with each node, in accordance with the present invention, in order to facilitate communications. Node directory 56 is the highest level directory which interacts with communication network 27 to receive communications from the network which are addressed to the node and to transmit communications to another node in the network. Subdirectory BIN 58 contains the communication program 60 in accordance with the present invention. The communication program 60 is explained, especially with regard to the flow diagram of FIGS. 8 and 9. Subdirectories 62, 64, and 66 each have symmetrical file structures. Each of these subdirectories contains a structure in which one allocated subdirectory is maintained for each node in the system. Each record received by node directory 56 is placed under IN directory 62 and the subdirectory which corresponds to the node which transmitted the record. These files are periodically scanned by the database interface 44 to check for received files. Received standardized records are translated utilizing the database interface 44 and then stored in the local database of the node. To transmit a record stored in the local database 46 of the node, the record is translated by the database interface 44 and a copy of the standardized record placed in the corresponding subdirectory of the destination node under OUT directory 64. The communication program 60 periodically scans the files in the OUT subdirectories and transmits the records via node directory 56 to the destination node in communication network 27. After the transmission of the outbound record, a duplicate copy of the record is placed in a corresponding subdirectory under HOLD directory 66; the transmitted record in the subdirectory under OUT directory 64 is deleted. If an acknowledgement is not received from the destination node within a predetermined time, an attempt to retransmit the record is repeated from the subdirectory under HOLD directory 66.

Figure 6:
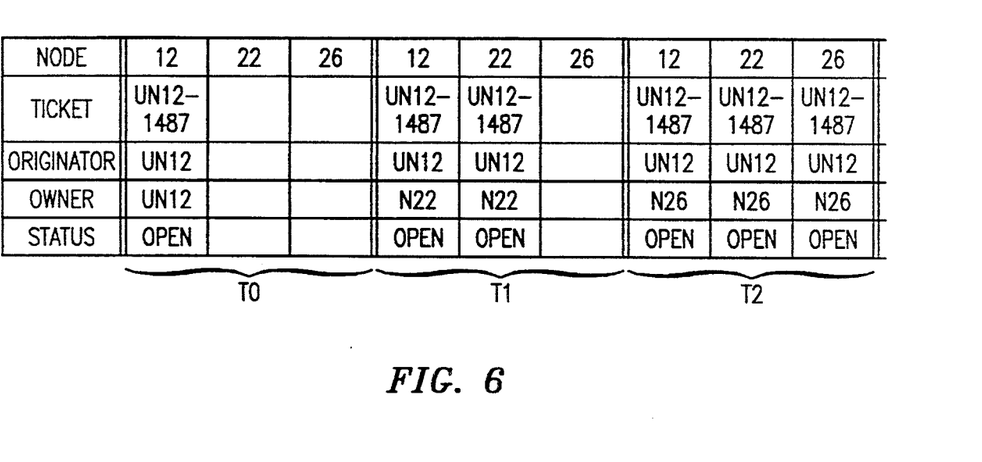
FIGS. 6 and 7 comprise a table that illustrates parameters utilized with each record in accordance with an embodiment of the present invention.
Figure 7:
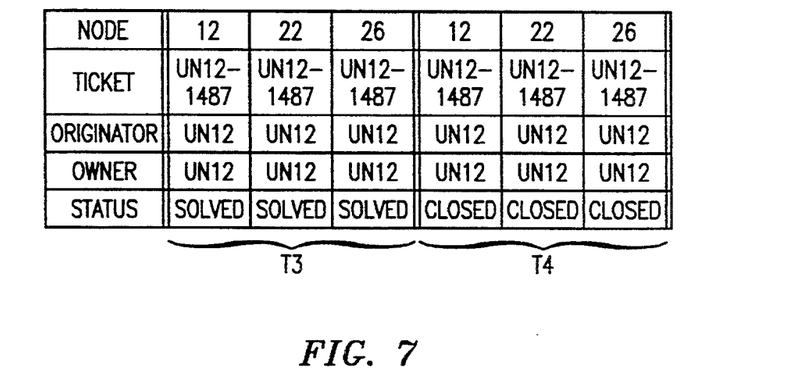

FIGS. 6 and 7 illustrate the status of parameters associated with a record relative to nodes 12, 22, and 26 of FIG. 1 at time intervals T0, T1, T2, T3, and T4. The state of the parameters shown in FIGS. 6 and 7 reflect states at the end of each interval. Time T0 corresponds to user node 12 creating a new record indicative of a problem. A unique ticket number which also identifies the originating node is assigned, i.e. UN 12-1487. User node 12 is also identified as the originator and owner of the trouble ticket; note the originator and owner rows in FIG. 6. The status of the trouble ticket is "open". In the illustrative example the record was created and entered in the local database of node 12 without causing the record to be transmitted as a trouble ticket to direct support node 22. This indicates that records may be opened and potentially closed by the originating user if the user determines a solution or otherwise decides that a trouble ticket is not to be generated. Thus the user's database can store records that are not trouble tickets.

Assuming that node 12 now wishes to communicate the stored record as a trouble ticket for direct support node 22, a person at node 12 will load the stored information from the local database 46 into database interface 44 which includes the parameters as shown. The owner is changed from node 12 to node 22. The ownership parameter identifies the node from which help is sought. The ownership of a given ticket may change from time to time depending upon the node from which help is sought. User node 12 always remains the originator and the ticket number is never changed during the communication of records from node to node. This allows each trouble ticket to be assigned a sequential number by each node. At user node 12, the record is placed in node 22 of the OUT directory 64 for transmission to node 22 by the communication program. Upon receiving the record at node 22, it is placed under IN directory 62 in the subdirectory corresponding to user node 12. It is then transferred to the local database 46 of node 22. Thus, following the successful completion of the transmission, the identical record will exist at nodes 12 and 22.

In this example, a service provider at node 22 is unable to handle the problem associated with ticket UN 12-1487 and makes a determination that the ticket should be escalated to node 26 for additional help from the technical experts in problem solving. At node 22, the record is retrieved from the local database into the database interface and the ownership changed from node 22 to node 26. Node 22 transmits the record at time period T2 to node 26 in a similar manner explained as for the transmission from node 12 to node 22. In addition, node 22 transmits the updated record to node 12 so that all nodes in the network will maintain identical data for each ticket. Each node in the network maintains an address table which identifies the node from which it received each trouble ticket and thus, permits a daisy-chain addressing by which updated tickets are transmitted to the nodes which contain corresponding stored records. Node 26 receives the record and stores it in its local database. Preferably, upon receipt of each ticket at each node, a corresponding e-mail message is generated to the person at the node associated with handling such tickets. Thus, at the end of time interval T2, nodes 12, 22, and 26 will each contain an identical copy of the ticket in each's database.

After considering the substance of the problem indicated in the ticket, node 26 may make a determination of the cause of the problem and provide a solution. The documentation for the problem cause and the proposed solution will be included as updated information to the ticket during time interval T3 and the status changed by node 26 from "open" to "solved". Node 26 initiates an update transmission of the ticket to node 22 which in the daisy-chain manner retransmits the updated ticket back to the originating node 12. It will also be noted that at time interval T3 the owner is changed from node 26 to user node 12, indicating that further disposition of the problem ticket with the proposed solution rests with the user at node 12.

The user at node 12 considers the proposed solution and accepts the solution proposed. During time interval T4, the user at node 12 changes the status of the message from solved to closed and transmits the updated record to node 22 which in daisy-chain manner transmits the message to node 26. As illustrated in time T4, each of the nodes communicating relative to the illustrative trouble ticket will contain an identical record which indicates the status of the ticket is closed thereby ending further problem solving consideration of the item by direct support providers at node 22 and the technical experts at central support node 26. The record can be maintained in the local database of the respective nodes and utilized for other related problems should similar problems occur; the record can also be used for statistical data purposes.

Figure 8:
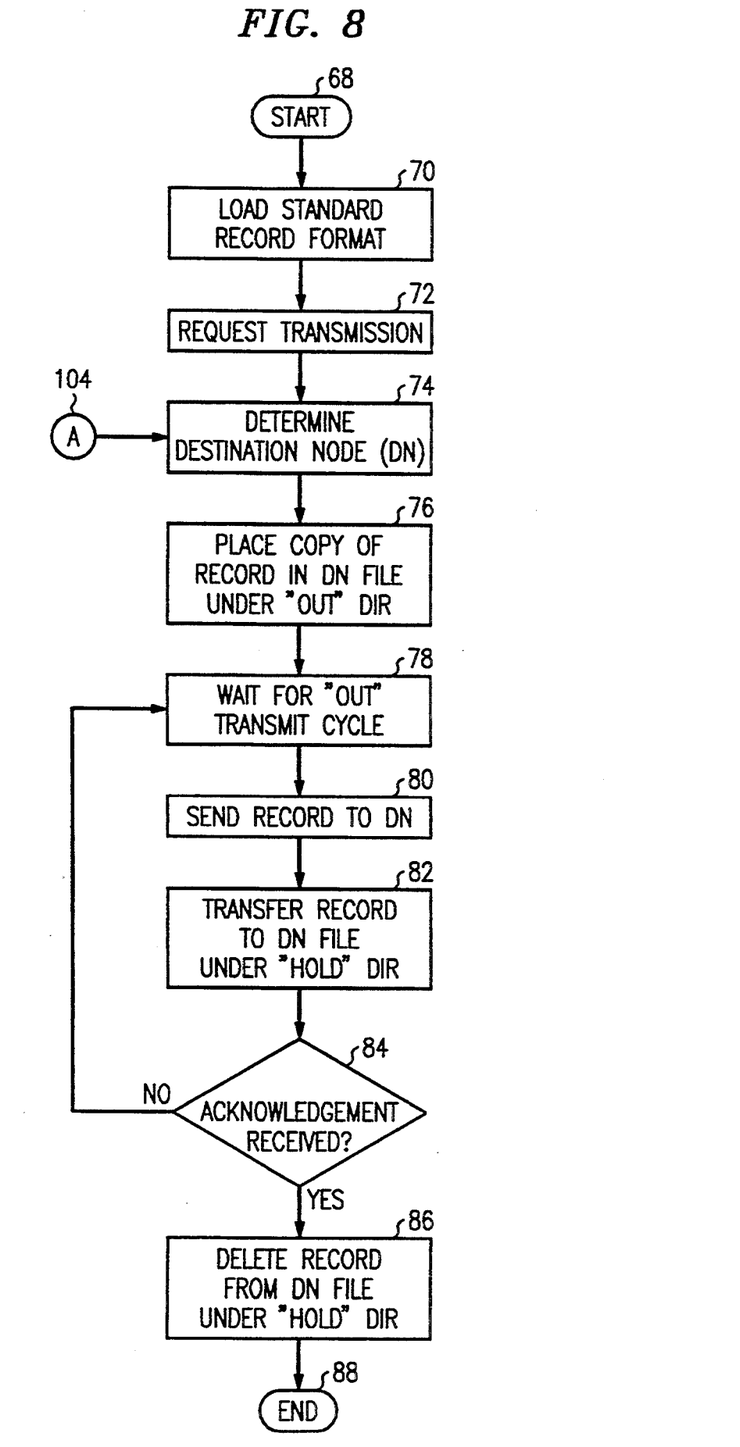
FIG. 8 is a flow diagram illustrating the transmission of a record from a node in accordance with an embodiment of the present invention.

FIG. 8 is a flow diagram illustrating steps in the transmission of a record to another node. Beginning at START 68, the record to be transmitted is loaded from the local database to the standard record format of the database interface 44 as indicated by step 70. It will be understood by those skilled in the art that the record may also be directly entered by the user into the database interface as well as being retrieved from storage in the local database. In step 72 the user requests transmission of the record to another node such as by changing the ownership of the record. The address of the destination node is determined in step 74. In a preferred embodiment of the present invention, the destination is determined from an originating node based upon a stored table which correlates the address of the node which services the equipment identified by the trouble ticket. Alternatively, the user at the originating node can directly enter the address of the node from which help is sought. Next, a copy of the trouble ticket is placed in the destination node (DN) subdirectory under the OUT directory. In accordance with the communication program, a predetermined time interval can be utilized in which to check for multiple records to be transmitted to the same destination. Step 78 represents that the record is held waiting for an OUT transmission cycle to be started. At the end of the cycle, the record is sent to the destination node, as indicated in step 80 through communication network 27. In step 82 a copy of the transmitted record is placed in the destination node subdirectory under the HOLD directory. In decision step 84 a determination is made if an acknowledgement has been received from the destination node within a predetermined time. If NO, control transfers to the beginning of step 78 to initiate a retransmission of the record. Upon a YES determination by step 84, the record stored in the destination node subdirectory under HOLD is deleted since a retransmission will not be required. The transmission step terminates at END 88. Thus, in accordance with the transmission according to the present invention, a trouble ticket or record is transmitted to another node in standardized record format based upon a corresponding local database record format.

Figure 9:
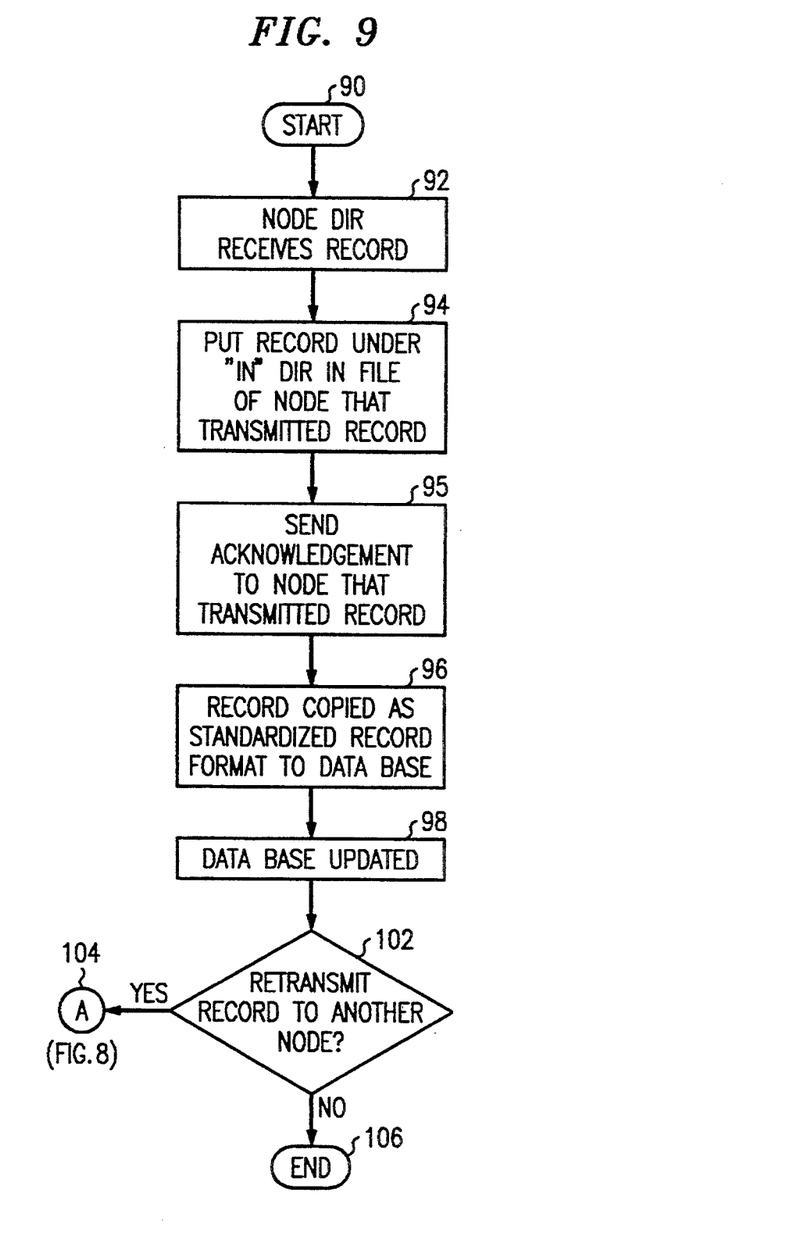
FIG. 9 is a flow diagram illustrating receipt of a record from another node in accordance with an embodiment of the present invention.

FIG. 9 is a flow diagram illustrating steps in accordance with the present invention for receiving a record transmitted from another node. Beginning at START 90, the general node directory 56 receives a record addressed for the subject node as indicated in step 92. In step 94 the received record is put under the IN directory in the subdirectory of the node which transmitted the record. In step 96 the record is copied from the subdirectory under the IN directory to the database interface 44 as a standardized record format. In step 95 an acknowledgement is sent to the node which transmitted the record acknowledging its successful receipt. In step 98 the database 46 is updated by the database interface 44 translating the standardized record format and storing the record in the local database 46. A determination is made in step 102 of whether to transmit the record to another node. This decision is based upon the destination contained with the record and the owner of the record. For example, if an originating node identifies the owner as a node other than an intermediate node which receives the record, the intermediate node will recognize the need to transmit the record to the designated owner. Upon a YES determination by step 102, control passes as indicated by transfer point "A" 104 back to step 74 as shown in FIG. 8. The transmission then continues as previously explained with regard to FIG. 8. A NO determination by step 102 indicates that further transmission is not required and concludes the receipt of the record at END 106.

In accordance with the present invention, a user friendly communication system is provided in which all nodes in the system requiring access to a record maintains the record in a local database. Subsequent updates of the record by any node are automatically distributed to the other nodes by utilizing a standardized record format. Thus, the present invention provides an enhanced communication system allowing independent database flexibility while still providing the relevant nodes in the network with up-to-date records.

Although an embodiment of the present invention has been described and shown in the drawings, the scope of the invention is defined by the claims which follow.

We claim:

1. A communication system comprising:
   first and second nodes coupled to each other;
   first and second databases associated with said first and second nodes respectively, each store records, said first database storing said records in a first field format and said second database storing said records in a second field format which is different from said first field format;

means at said first and second nodes for transmitting records having standardized format to and receiving records having standardized format from the other of said first and second nodes, said standardized format being different from said first and second field formats;

means at said first node for automatically translating a received standardized format record into said first field format record for storage in said first database and for automatically translating a first field format record stored in said first database into standardized format record for transmission to said second node;

means for independently identifying an originator and an owner of each record, said translating and transmitting means acting to translate and transmit a first record contained in said first database associated with said first node to said second database associated with said second node based upon entry in said first record of an owner associated with said second database, wherein records in said first database that do not identify an owner are not transmitted to said second database;

said identifying means permitting the identified owner of a duplicate record stored at the second database and corresponding to said first record to be changed thereby changing responsibility for acting on the duplicate record and causing the duplicate record with changed ownership to be automatically transmitted to a database associated with the changed owner.

2. The system according to claim 1 further comprising a plurality of other nodes in addition to said first and second nodes, said other nodes comprising:
  a database;
  means for transmitting standardized format records and receiving standardized format records and
  means for automatically translating a received standardized format record into its field format record for storage in its database and for automatically translating a record stored in its database into a standardized format record for transmission to one of said first, second, and other nodes.

3. The system according to claim 1 further comprising means associated with said second node for automatically transmitting a copy of an updated first record based on the original record from said second database to the first database containing the corresponding original record, said first database storing said updated first record.

4. The system according to claim 1 further comprising means for labeling each record at its creation with a unique identification number which identifies all corresponding records in the communication system.

5. A first node for use in a communications system having a plurality of nodes, said first node comprising:
  first database that stores records in a first field format;
  means for transmitting records having standardized format to and receiving records having standardized format from one of said nodes, said standardized format being different from said first field format;
  means for automatically translating a standardized format record into said first field format for storage in said first database and for automatically translating a first field format record stored in said first database into a standardized format record for transmission to one of said nodes;
  means for independently identifying an originator and an owner of each record, said translating and transmitting means acting to translate and transmit a first record contained in said first database associated with said first node to a second database associated with a second node based upon entry in said first record of an owner associated with said second database, wherein records in said first database that do not identify an owner are not transmitted to said second database;
  said identifying means permitting the identified owner of a duplicate record stored at the second database and corresponding to said first record to be changed thereby changing responsibility for acting on the duplicate record and causing the duplicate record with changed ownership to be automatically transmitted to a database associated with the changed owner.

6. The node according to claim 5 further comprising means for automatically sending records stored in the first database that have been modified to other nodes which contain corresponding records thereby keeping corresponding records at other nodes updated.

7. The node according to claim 5 further comprising means for labeling each record at its creation with a unique identification number which always identifies all corresponding records in other nodes in the communication system.

8. A method for handling records in a communications system which includes at least first and second nodes having first and second databases, respectively, said first database storing records in a first field format and said second database storing records in a second field format which is different from said first field format, said method comprising the steps of:
  transmitting records having a standardized format from said first node and receiving records having a standardized format at said first node from said second node, said standardized format being different from said first and second field formats;
  automatically translating a standardized format record received by said first node into said first field format record for storage in said first database and for automatically translating a first field format record stored in said first database into a standardized format record for transmission to said second node;
  independently identifying an originator and an owner of each record, said translating and transmitting steps translating and transmitting a first record contained in said first database associated with said first node to said second database associated with said second node based upon entry in said first record of an owner associated with said second database, wherein records in said first database that do not identify an owner are not transmitted to said second database;
  said identifying step permitting the identified owner of a duplicate record stored at the second database and corresponding to said first record to be changed thereby changing responsibility for acting on the duplicate record and causing the duplicate record with changed ownership to be automatically transmitted to a database associated with the changed owner.

9. The method according to claim 8 further comprising the step of automatically updating records stored in databases of other nodes upon a corresponding record being modified at one node in the communication system.

10. The method according to claim 8 further comprising the step of labeling each record at its creation with a unique identification number which identifies all corresponding records in other databases in the communication system.

11. The method according to claim 8 wherein said identifying step permits the owner of a corresponding set of records to be changed by any node which stores one of the corresponding records thereby allowing the responsibility for acting on the record to be changed.

12. A method for handling records by a node in a communications system having other nodes, said method comprising the steps of:

storing records using a first field format in a first database;

transmitting records having a standardized format to and receiving records having a standardized format from said other nodes, said standardized format being different from said first field format;

automatically translating a standardized format record received from one of said other nodes into a first field format record and storing said translated record in said first database;

translating a first field format record stored in said first database into standardized format record and transmitting said standardized record to at least one of said other nodes;

independently identifying an originator and an owner of each record, said translating and transmitting steps translating and transmitting a first record contained in said first database associated with said first node to said second database associated with said second node based upon entry in said first record of an owner associated with said second database, wherein records in said first database that do not identify an owner are not transmitted to said second database;

said identifying step permitting the identified owner of a duplicate record stored at the second database and corresponding to said first record to be changed thereby changing responsibility for acting on the duplicate record and causing the duplicate record with changed ownership to be automatically transmitted to a database associated with the changed owner.

13. The method according to claim 12 further comprising the step of automatically sending records stored in the first database that have been modified by a user to other nodes which contain corresponding records thereby keeping corresponding records at other nodes updated.

14. The method according to claim 12 further comprising the step of labeling each record at its creation with a unique identification number which identifies all corresponding records in other nodes in the communication system.

15. The method according to claim 12 wherein said identifying step permits the owner of a corresponding set of records to be changed by a node which stores one of the corresponding records thereby allowing the responsibility for acting on the record to be changed.

* * * * *